United States Patent [19]

Yates et al.

[11] Patent Number: 5,030,412
[45] Date of Patent: Jul. 9, 1991

[54] FUEL ASSEMBLY DEBRIS SCREEN

[75] Inventors: Jack Yates, Richland; Richard H. Ewing, W. Richland; John F. Patterson, Richland, all of Wash.

[73] Assignee: Advanced Nuclear Fuels Corporation, Richland, Wash.

[21] Appl. No.: 518,888

[22] Filed: May 4, 1990

[51] Int. Cl.⁵ .............................................. G21C 1/04
[52] U.S. Cl. ................................. 376/352; 376/313; 376/434; 376/439; 376/440; 376/442; 376/438; 376/443; 376/315
[58] Field of Search ............... 376/434, 313, 439, 440, 376/442, 438, 443, 315, 352

[56] References Cited

U.S. PATENT DOCUMENTS

| | | | |
|---|---|---|---|
| 4,652,425 | 3/1987 | Ferrari et al. | 376/352 |
| 4,664,880 | 5/1987 | Bryan | 376/352 |
| 4,675,154 | 6/1987 | Nelson et al. | 376/444 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,781,884 | 11/1988 | Anthony | 376/352 |
| 4,828,791 | 5/1989 | DeMario | 376/352 |
| 4,832,905 | 5/1989 | Bryan et al. | 376/352 |
| 4,849,161 | 7/1989 | Brown et al. | 376/439 |
| 4,919,883 | 4/1990 | Bryan | 376/352 |

Primary Examiner—Brooks H. Hunt
Assistant Examiner—Meena Chelliah
Attorney, Agent, or Firm—Ira Lee Zebrak

[57] ABSTRACT

A debris screen for a fuel assembly for a reactor to which coolant fluid is supplied comprises a substantially planar plate member having an array of coolant openings extending through the plate member dimensioned to trap at least a portion of debris particles carried by the coolant; and a skirt member enclosing the periphery of the plate member; each of the coolant flow openings having a coolant entry region at a lower surface, a coolant exit region at an upper surface and a coolant flow path extending between the entry and exit regions, the flow path including an intermediate segment laterally offset from the entry and exit regions to cause coolant to change direction of flow in the intermediate segment and thereby prevent at least a portion of the debris particles from passing through the plate members.

15 Claims, 4 Drawing Sheets

FUEL ASSEMBLY DEBRIS SCREEN

FIELD OF THE INVENTION

This invention is directed to a debris-resistant nuclear fuel assembly and, more particularly to such an assembly employing a lower tie plate unit constructed to collect potentially harmful debris carried in the flow of coolant material (e.g. water). The invention is useful either alone or in combination with a debris-resistant grid spacer arrangement of the type described in U.S. Pat. No. 4,849,161, granted to Charles A. Brown et al. on July 18, 1989, which patent is assigned to the same assignee as the present invention, or for incorporation in a debris-resistant lower tie plate assembly described in a concurrently filed U.S. application Ser. No. (07/0518891) of Brown et al., also assigned to the same assignee as the present invention.

BACKGROUND OF THE INVENTION

As is stated in the Brown et al patent, in the operation of nuclear reactors such as pressurized water reactors (PWR's) or in boiling water reactors (BWR'S), it has been found that debris such as nuts, bolts, metal cuttings, wires, and drill bits sometimes accumulate in the reactor during construction, repair or the like. Certain mid-range sizes ($\frac{1}{2}$" to 4") of this type of debris are particularly troublesome, since that debris is likely to be carried by cooling water to the area near the bottom (lower ends) of the fuel rods. The debris vibrates in the moving coolant and impacts principally upon lower ends of the rods, ultimately abrading and causing fretting wear of the fuel rod cladding at that point. This type of wear is recognized as a significant cause of fuel failures. As is noted in the Brown et al patent, one prior approach to this problem was to use extra long solid lower end caps on the fuel rods. The end caps did not contain fuel and therefore there would be no escape of radiation if extensive fretting wear occurred in the end caps. However, that approach of using elongated end caps reduces the fuel column length and may result in a reduction of power output for a given overall size of the reactor.

In the Brown et al. patent, a lowermost grid spacer is described which is positioned on or only slightly above the lower tie plate. The geometry of the Brown grid spacer is arranged to divide coolant flow openings in the lower tie plate into smaller openings and thereby trap at least part of the debris in the zone near the lower tie plate before the debris comes in contact with the fueled portion of the rods.

As an indication of the significance of the debris problem, reference may be made, for example, to recently issued U.S. Pat. such as Nos. 4,652,425—Ferrari et al , granted Mar. 24, 1987; No. 4,684,495—Wilson et al., granted Aug. 4, 1987; No. 4,684,496—Wilson et al., granted Aug. 4, 1987; No. 4,781,884—Anthony, granted Nov. 1, 1988; No. 4,828,791—De Mario, granted May 9, 1989 and No. 4,832,905—Bryan et al , granted May 23, 1989.

While a number of the foregoing proposals to reduce the debris problem have focused remedial attention on the region in the vicinity of the lower tie plate, certain of the proposals have required that additional space in the vicinity of the tie plate be taken from the length of the active fuel rods in order to insert means to accomplish the desired collection of debris. Other proposed approaches also may result in an unacceptable drop in coolant pressure, thereby adversely affecting the desired heat transfer to the coolant.

The present invention, on the other hand, is directed towards a lower tie plate assembly incorporating an integral, improved debris screen or alternatively, having an added debris screen positioned within the confines of an existing lower tie plate but which is capable of trapping significant additional debris.

STATEMENT OF THE INVENTION

In accordance with one aspect of the present invention, a debris screen for a fuel assembly for a reactor to which coolant fluid is supplied comprises a substantially planar plate member having an array of coolant openings extending through the plate member dimensioned to trap at least a portion of debris particles carried by the coolant and a skirt member enclosing the periphery of the plate member; each of the coolant flow openings having a coolant entry region at a lower surface, a coolant exit region at an upper surface and a coolant flow path extending between the entry and exit regions, the flow path including an intermediate segment laterally offset from the entry and exit regions to cause coolant to change direction of flow in the intermediate segment and thereby prevent at least a portion of the debris particles from passing through the plate members.

DETAILED DESCRIPTION

Figure 1:
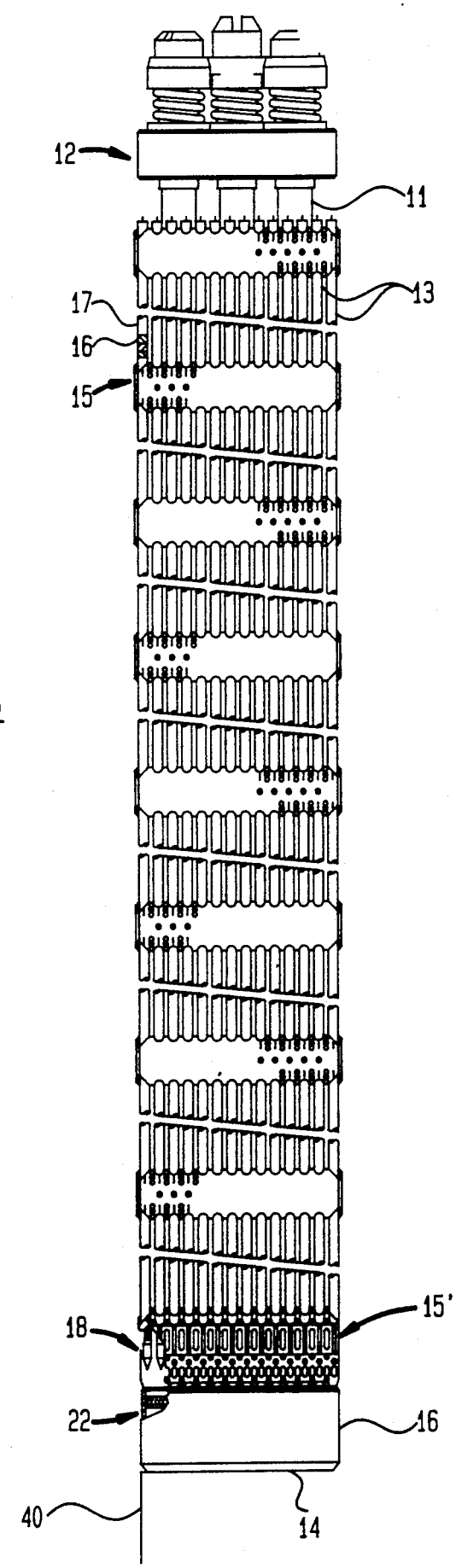
FIG. 1 is an elevation view, partially in section, of a fuel assembly incorporating one version of the present invention, the assembly being foreshortened in height and partially broken away for convenience and clarity.

Referring to FIG. 1, a 14×14 fuel bundle assembly is indicated generally by the reference numeral 10. The fuel assembly 10 includes an upper tie plate 12 and a lower tie plate 14 capturing at opposite ends a plurality of (e.g. 176) fuel rods 13. A plurality of guide tubes 11 are secured to upper tie plate 12 and to lower tie plate 14. A plurality of grid spacers 15 (e.g. eight) are disposed along the length of the fuel rods 13 at locations between the tie plates 12, 14 and form cells, as is well known, through which the fuel rods 13 and guide tubes 11 extend. A lowermost one 15' of the grid spacers is illustrated as a debris-resistant spacer of the type shown and described in U.S. Pat. No. 4,849,161 of Brown et al. The description of that debris-resistant spacer 15' contained in the Brown et al. patent is herein incorporated by reference.

Each of the fuel rods 13 includes a stack of fuel pellets 16. The pellets 16 in each stack are maintained in close proximity to each other by means of a spring 17 disposed between an upper end of the rod 13 and the uppermost one of the pellets 16. The lower end cap 18 of each fuel rod is in close proximity to but spaced away from the upper portion of lower tie plate 14 to take into account the expected linear growth of the rods 13 in the normal operation of the reactor. The total height from the bottom of lower tie plate 14 to the top of the uppermost pellet 16 (i.e. the top of the active fuel) may, for example, be a few inches less than twelve feet.

Figure 2:
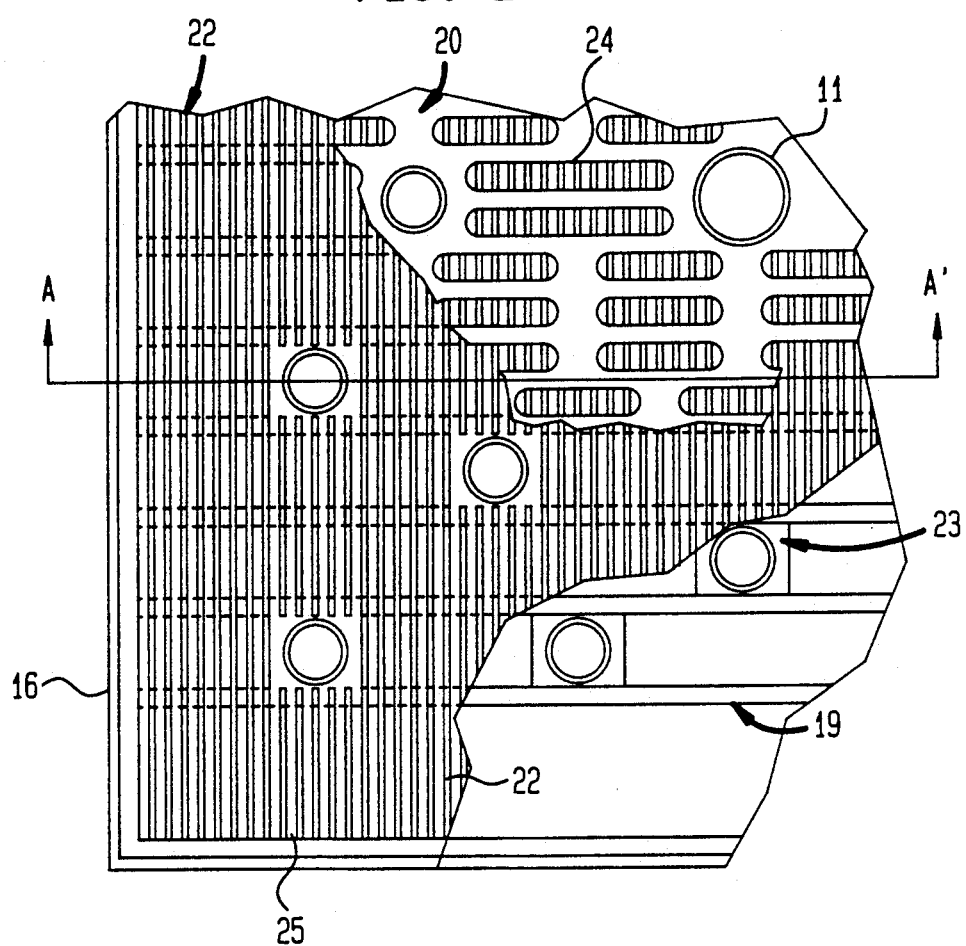
FIG. 2 is a partial plan view, drawn to a different scale than FIG. 1, of one version of a lower tie plate arrangement constructed in accordance with the present invention.
Figure 3:
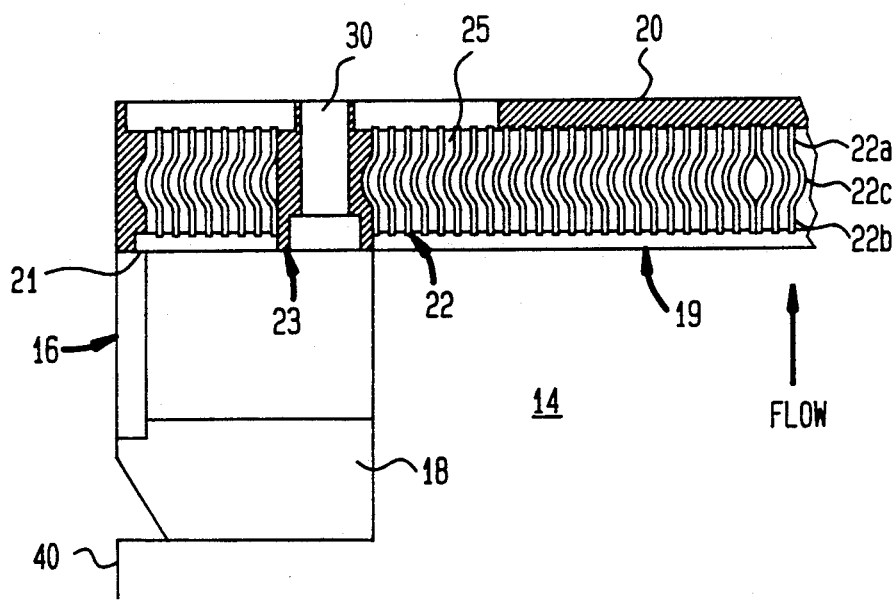
FIG. 3 is a sectional view, drawn to the same scale as FIG. 2, along the line A-A' shown in FIG. 2.

Referring now to FIGS. 2 and 3, one version of a lower tie plate assembly 14 constructed in accordance with the present invention is shown. Lower tie plate 14 comprises a multi-apertured, upper planar member or plate 20, a partial plan view of which is shown in FIG. 2. Planar member 20 contains a number of elongated openings or holes 24 adapted for flow of coolant out of the assembly in a vertical direction from one or more inlets below tie plate 14 as indicated by the vertical arrow in FIG. 3.

A downwardly extending skirt 16 is fastened around the periphery of upper planar member 20. Skirt 16 may extend substantially to a lower core support plate 40 as indicated in FIG. 1 or, alternatively, front and rear portions of skirt 16 may be foreshortened except for the lower most extensions thereof which are provided at the corners 18 of tie plate 14 (see e.g. FIG. 8).

An array of regularly spaced, substantially parallel, curved or bowed blades or plates 22 are connected between two sides (e.g. front and back) of the skirt 16 and extend downwardly between upper plate 20 and an array of parallel lower cross tie members or bars 19. The skirt 16 typically may be provided with a shoulder 21 for supporting the ends of lower cross tie bars 19. Suitable support blocks 23 for guide tubes 11 and apertures 30 for receiving guide tube screws (not shown) are provided at appropriate locations within lower tie plate 14.

The curved plates 22 may be bowed as shown or may be of "hairpin" shape. It should be noted that the two curved blades 22 which are adjacent each other at a midpoint of the assembly (see third blade from broken away right hand end in FIG. 3) are disposed in reverse directions to provide symmetry. In any case, it is intended that the curve or bend of curved plates 22 be such that there is no straight, unobstructed path through the openings or spaces 25 between adjacent pairs of curved plates 22. The curved plates 22 comprise an upper end portion 22a, a lower end portion 22b and an intermediate laterally offset segment 22c. The direction of coolant flow in at least the offset segment 22c is changed, for example by 90°.

The curved plates 22 are fastened to the lower cross tie bars 19, for example, by brazed connections. Similarly, curved plates 22 are fastened to upper plate 20 (or to upper cross tie members—not shown) by brazed connections.

Coolant supplied from below the lower tie plate 14 typically carries debris of the type noted above. As the coolant (water) flows upwardly through the offset or non-lineal spaces 25 between adjacent pairs of curved plates 22, debris of a dimension greater than the width of spaces 25 (e.g. of the order of less than one-tenth inch) may be expected to be intercepted by the effective screen provided by the array of curved plates 22. Where an upper plate 20 having limiting apertures 24 also is provided, an additional portion of the debris which may pass through the spaces 25 also will be intercepted by the non-apertured portion of upper plate 20. In any case, the debris, which typically is relatively heavy metallic material, will tend to drop down below the plates 22.

A bowed, hairpin or other similar shape of blades 22 is effective to prevent passage of relatively long, narrow pieces of debris such as wire from passing through spaces 25 and thereafter passing through upper plate 24. Such long wire debris would, to a greater extent, pass through a screen including simple, unobstructed vertical slots or channels as has been proposed in some prior screens. The offset in the intermediate portion 22c of the blades 22 is effective to turn a piece of wire from a vertical direction to a non-vertical direction of movement as that material passes from the lower section 22b to the intermediate portion 22c. The hairpin or curved space 25 is effective to prevent the long type of debris from streaming on through the space 25. While the foregoing arrangement may be expected to result in some increase in pressure drop (e.g. of the order of twenty-five percent) as compared to straight holes through a plate of similar thickness, the beneficial effect of filtering out debris is considered to outweigh the disadvantage of such a pressure drop in the coolant.

Figure 4:
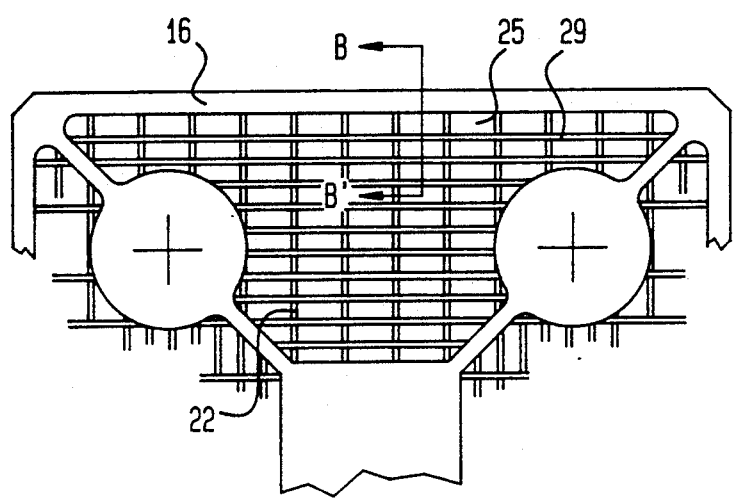
FIG. 4 is a partial plan view, of a second version of a debris screen for use in a lower tie plate arrangement constructed according to the present invention.
Figure 5:
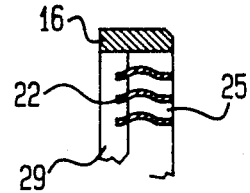
FIG. 5 is a partial sectional view taken along the line B-B' in FIG. 4.
Figure 6:
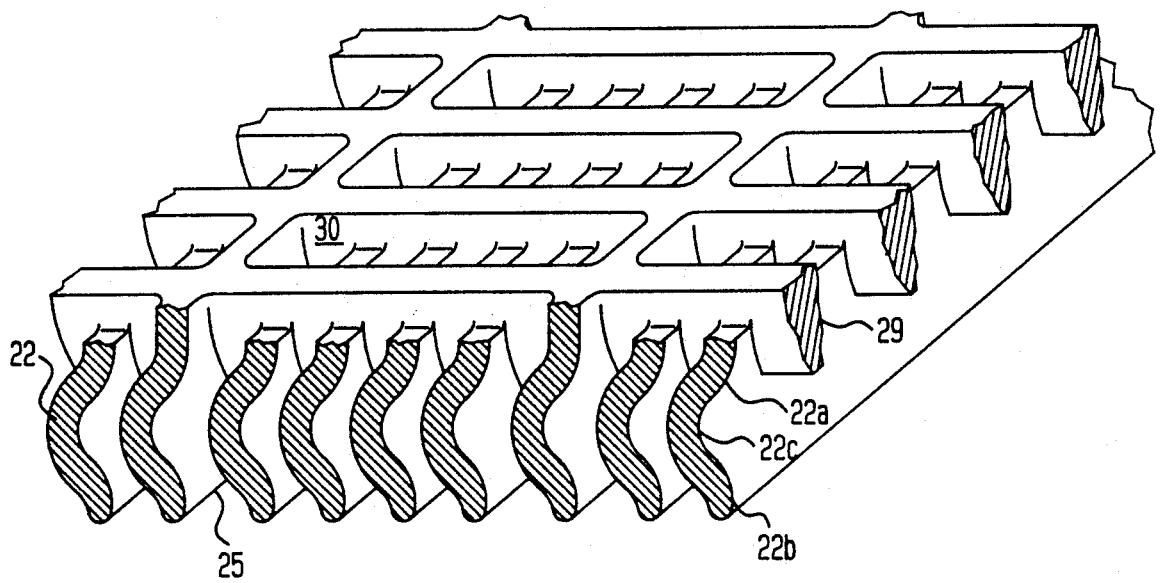
FIG. 6 is a partial isometric view of the second version of a debris screen constructed according to the present invention.

Referring now to FIGS. 4-6 of the drawing (which are not all drawn to the same scale), a second embodiment of the invention is shown in which bowed blades 22 (e.g. three-quarter inch high), interconnecting upper cross tie members 29 (e.g. one-half inch high by one-eighth inch wide) and an overall integral screen structure are formed, for example as a unitary casting (see FIG. 4). A substantial number of the curved or bowed blades 22 have a recess 30 (e.g. ⅛" deep) at their upper extreme. The uppermost surfaces of cross tie members 29 and non-recessed blades 22 are spaced apart by an appropriate distance to support rods (not shown) which may contact those surfaces. As can be seen in the cross-sectional view of FIG. 5, a skirt 16 also may be cast integrally with the blades 22 and cross tie members 29. As a result of the rigidity of the cast structure, no lower cross tie members are required in this embodiment. It should be noted, however, that a greater pressure drop (up to 50%) may be encountered utilizing a casting since the roughness of the walls of the blades 22 will be increased and the flow even will be reduced as compared to that, for example, of sheet or strip metal which may be employed in the arrangement of FIG. 2. The casting may however, be made smooth by conventioned methods. However, like the embodiment of FIG. 2, the blades 22 of FIG. 6 are shaped so that there is no direct, line-of-sight, open passage through the spaces 25.

Figure 8:
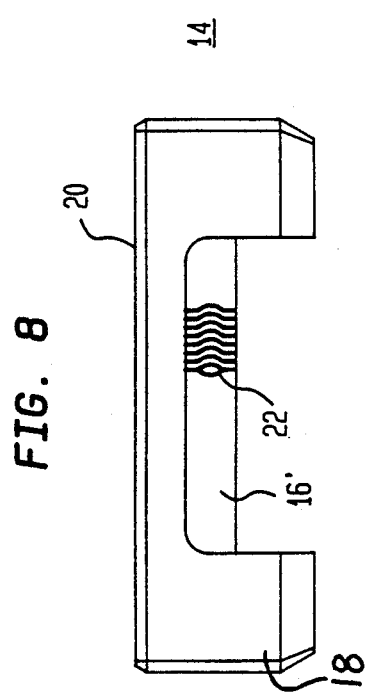
FIG. 8 is a front elevation, partially broken away, of a lower tie plate incorporating the debris screen of FIG. 7 as a retrofit assembly.
Figure 7:
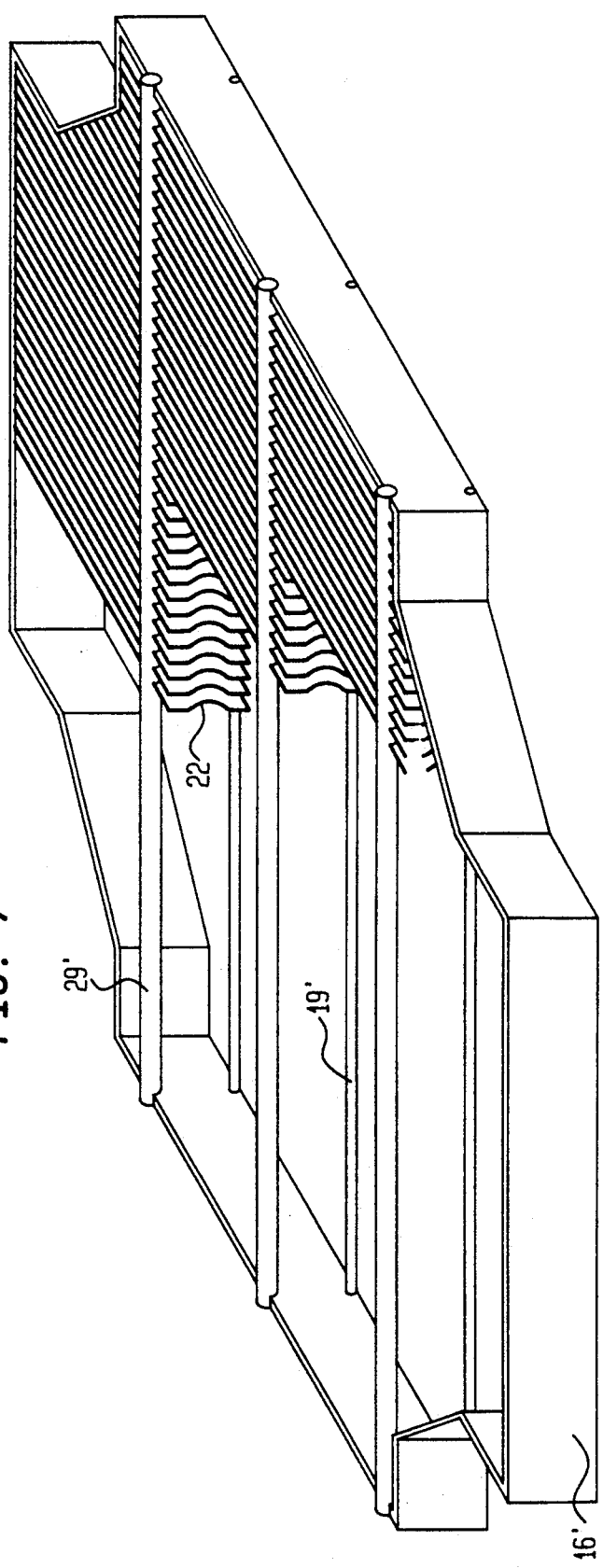
FIG. 7 is a partial isometric view of a third version of a debris screen constructed according to the present invention.

Referring now to FIGS. 7 and 8, a third embodiment of the invention is shown. In the front elevation shown in FIG. 8, an arrangement is shown employing a screen assembly similar to that of FIG. 2 but which is added below an upper plate 20 of a standard lower tie plate 14. That is, in FIG. 8, an arrangement is shown in which a debris screen including an array of curved blades is retrofit into an existing lower tie plate 14. In that case, appropriate openings or cutouts may be required in the overall shape of the debris screen to accommodate existing guide tube screws (not shown) and locating pins (not shown) on a lower core support plate 40 associated with lower tie plate 14. One such configuration is shown in FIG. 7.

In FIG. 7, both upper tie bars 29' and lower tie bars 19' are shown, the latter being of smaller diameter (e.g. ⅛") as compared to the former (e.g. 3/16"). However, only three pairs of such bars 19', 29' are shown for purposes of illustration. In an actual arrangement, for example, fourteen pairs of bars 19', 29' are utilized. The bars are spaced so as to intercept any rods which might drop down in the fuel assembly. Furthermore, while the lower tie bars 19' are illustrated as being flush with the lower edge of skirt 16, the upper tie bars 29' are illustrated as projecting above the top edge of skirt 16 to provide an effect similar to that of the embodiment of FIG. 6 (i.e. the bowed plates 22 are vertically recessed). As was described in connection with the embodiment of FIG. 2, the arrangement of FIG. 7 (and FIG. 8) may employ sheet or strip material connected by brazing to the tie bars 29'. Appropriately shaped cutouts (not seen) are provided in the upper and lower edges of each of bowed blades 22 to accept the (round) shape o tie bars 19' and 29'.

The described invention is considered to be effective to trap debris having a cross-sectional area greater than about 0.100 inches and to trap most wire debris longer than about 0.50 inches, whereas prior art anti-debris devices have been found to be generally ineffective for trapping wire. In general, wire debris has been observed to align with the direction of coolant flow and, since there is no direct line of sight through the spaces 25 in the arrangements described herein, wires entering the spaces 25 will approach the point of inflection in the spaces 25 at a substantial angle to the direction of coolant flow out of that point. The wires are then unable to follow the change in coolant flow direction and will be trapped. A similar effect occurs with other debris as well.

Apparatus according to this invention may be incorporated into lower tie plates for new fuel stacks or advantageously may be retrofit into irradiated fuel by, for example, employing appropriate spring clips or latches to attach the unit to existing lower tie plate corner posts as is partially shown in FIG. 7.

In general, the planar area of solid members which make up a screen as described above constitutes approximately twenty-five percent of the total available flow area, which will generally result in an increased pressure drop of acceptable magnitude. Certain installations are capable of accommodating greater pressure drops than others and, in that case, a cast arrangement such as is shown in FIGS. 4-6 may be employed.

Various modifications within the scope of this invention readily may occur to persons skilled in this art and the scope of the invention is set forth in the following claims.

WHAT IS CLAIMED IS:

1. A debris screen for a fuel assembly for a reactor to which coolant fluid is supplied comprising:
   a substantially planar plate member of material impervious to fluid having an array of coolant openings extending through said plate member dimensioned to trap at least a portion of debris particles carried by the coolant; and
   a skirt member enclosing the periphery of said plate member;
   each said coolant flow opening having a coolant entry region at a lower surface of said plate member, a coolant exit region at an upper surface of said plate member and a coolant flow path extending between said entry and exit regions, said flow path including an intermediate segment laterally offset from said entry and exit regions to cause coolant to change direction of flow in said intermediate segment and thereby prevent at least a portion of the debris particles from passing through said plate member.

2. A debris screen according to claim 1 wherein said intermediate segment is offset horizontally from said entry and exit regions by an amount such that no straight path exists through said flow opening between said upper and lower surfaces.

3. A debris screen according to claim 1 wherein said intermediate segment is curved and said entry and exit regions extend in a substantially vertical direction.

4. A debris screen according to claim 1 wherein said intermediate segment includes an inflection zone at which direction coolant of flow changes, said entry and exit regions extending from said respective lower and upper surfaces to said inflection zone along oppositely sloped lower and upper end portions of said coolant flow openings.

5. A debris screen according to claim 4 wherein said coolant flow openings are so dimensioned and sloped that no straight flow path in a vertical direction exists between said upper and lower surfaces.

6. A debris screen according to claim 3 wherein said coolant flow openings are so dimensioned and curved that no straight flow path in a vertical direction exists between said upper and lower surfaces.

7. A debris screen according to claim 1 wherein said planar member comprises an array of regularly spaced, upright, substantially parallel blades extending between two sides of said skirt member, each said blade having relatively straight segments disposed such that straight segments of adjacent ones of said blades define said entry and exit regions respectively, and a curved intermediate segment disposed such that intermediate segments of adjacent ones of said blades define said intermediate segments of said coolant flow openings.

8. A debris screen according to claim 7 wherein said intermediate segment includes an inflection zone at which direction coolant flow changes, said entry and exit regions extending from said respective lower and upper surfaces to said inflection zone along oppositely sloped lower and upper end portions of said coolant flow openings.

9. A debris screen according to claim 7 wherein said curved intermediate segment is offset laterally from said straight segments such that no straight flow path exists through said plate member.

10. A debris screen according to claim 7 wherein said planar plate member comprises a plurality of parallel spaced apart, cross-tie members extending transversely with respect to and attached to said blades.

11. A debris screen according to claim 10 and further comprising a second plurality of spaced apart, parallel cross-tie members extending transversely with respect to and supporting said blades at said entry region.

12. A debris screen according to claim 10 wherein said blades are recessed relative to said cross-tie members.

13. A debris screen according to claim 12 wherein said cross-tie members are supported on said skirt member.

14. A debris screen according to claim 10 wherein said cross-tie members and said blades are fastened to said skirt member.

15. A lower tie plate assembly for a reactor fuel assembly comprising:

a substantially planar plate member of material impervious to fluid having an array of relatively small coolant flow openings extending in a generally vertical direction through said plate member and dimensioned to trap at least a portion of debris particles carried by said coolant; and a skirt member extending along the periphery of and enclosing said planar member;

each of said coolant flow openings having a coolant entry region at a lower surface of said plate member, a coolant exit region at an upper surface of said plate member and a coolant flow path extending between said entry and exit regions, said coolant flow path including an intermediate segment laterally offset from said entry and exit regions to cause coolant to change flow direction in said intermediate segment;

the assembly further comprising leg portions attached to said skirt member for supporting said assembly in cooperative relationship between a fuel assembly and a lower core support plate.

* * * * *